June 28, 1966   R. N. BOOTH   3,258,106
MECHANISM FOR ORIENTING SETSCREWS
Filed Dec. 18, 1964   2 Sheets-Sheet 1
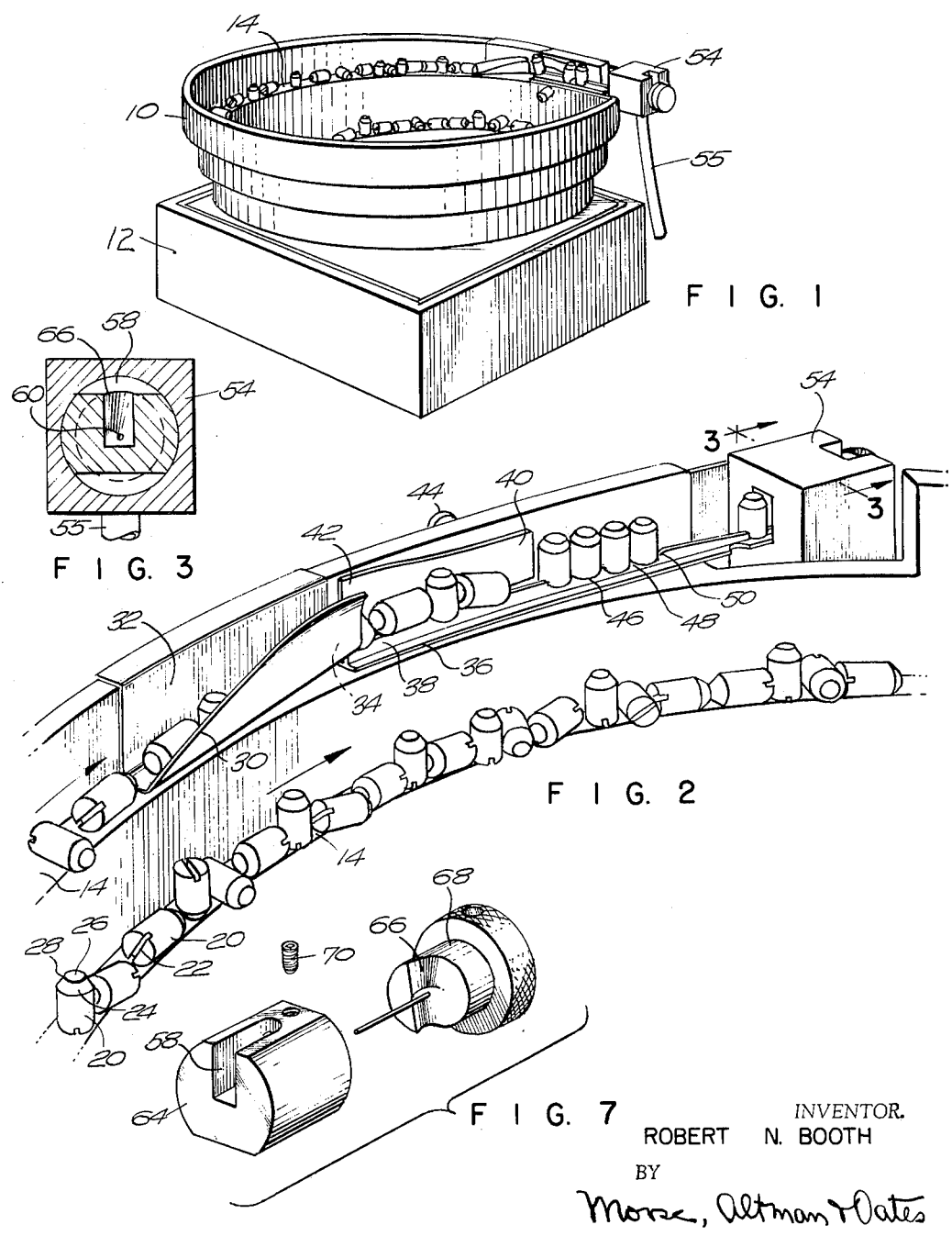
INVENTOR.
ROBERT N. BOOTH
ATTORNEYS

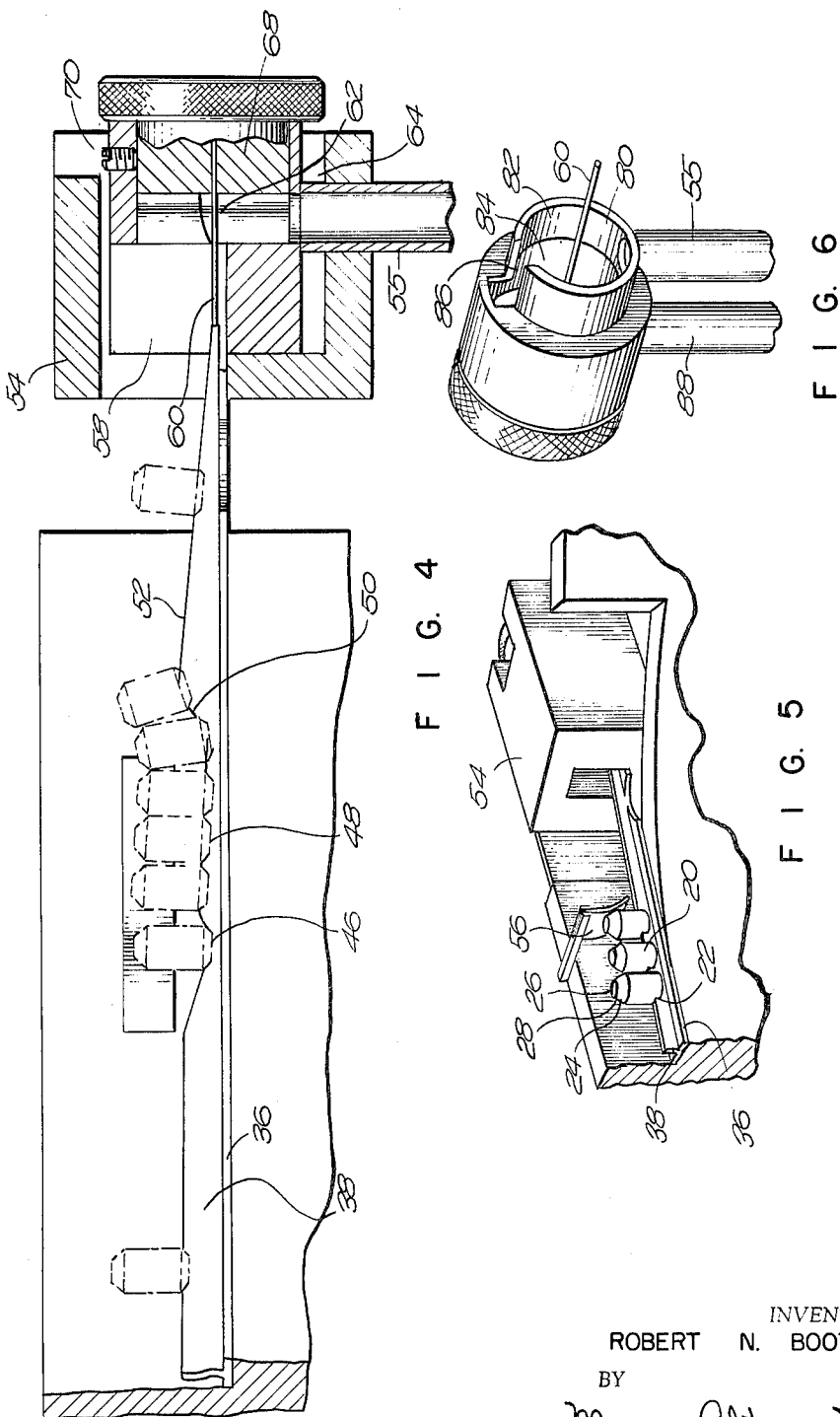

United States Patent Office 3,258,106
Patented June 28, 1966

3,258,106
MECHANISM FOR ORIENTING SETSCREWS
Robert N. Booth, Waltham, Mass., assignor to George W. Moore Inc., Waltham, Mass., a corporation of Massachusetts
Filed Dec. 18, 1964, Ser. No. 419,387
6 Claims. (Cl. 198—33)

This invention relates to mechanism for orienting headless setscrews which have a slot in one end to receive the blade of a driving tool. Setscrews of this kind are often used in large numbers in devices into which they are driven by automatic machinery. For this purpose the setscrews must be presented to the driving machine uniformly oriented. Many mechanisms have been devised and constructed for this purpose and have operated with more or less reliability. It is an object of the present invention to provide a mechanism which feeds headless setscrews into a tube uniformly with a high degree of reliability. An electrically vibrating bowl is employed to cause the screws to move up a helical track to the rim of the bowl. Devices at the rim of the bowl reject imperfect or improperly oriented screws and permit the properly oriented screws to enter a feed tube by which they are conducted to a driving machine or the like.

An embodiment of the invention is hereinafter described in detail and is illustrated on the drawings, of which FIGURE 1 is a perspective view of a vibrating bowl on which an embodiment of the invention is mounted;

FIGURE 2 is a perspective view, on a larger scale, of the orienting mechanism shown in FIGURE 1;

FIGURE 3 is a section on the line 3—3 of FIGURE 2;

FIGURE 4 is a plane development, on a larger scale, of a portion of the apparatus shown in FIGURE 2, the inverting box being shown in section;

FIGURE 5 is a fragmentary perspective view of the bowl and inverter including a modified detail;

FIGURE 6 is a perspective view of a modified inverter; and

FIGURE 7 is an exploded perspective view of inner parts of the inverter shown in FIGURE 4, but on a smaller scale.

In FIGURE 1 a vibrating bowl 10 is conventionally shown, this bowl being of the type described and illustrated in U.S. Patent No. 2,718,957. Electrically operated mechanism within the base 12 causes the bowl to vibrate in a manner to make small articles therein advance up a helical path 14 inside the wall of the bowl until they approach the rim of the bowl where provision is made for the discharge of such articles from the bowl.

The present invention has to do with small headless screws 20 having a transverse slot 22 across one end to receive the blade of a driving tool, the other end being a cup end, that is, the end opposite the slotted end is chamfered as at 24 and has a central conical recess 26, the chamfer and the recess forming a sharp circular edge 28 designed to bite into the surface against which the end of the setscrew is driven. As the bowl vibrates, the setscrews progress from the bottom of the bowl up the gradual incline of the helical path 14. As the screws are dumped into the bowl promiscuously, they will ordinarily be in various positions with respect to the path, that is, they may align themselves with the direction of movement, with either end leading, or may be athwart the path, with either end facing inward, or may be upright, with either end uppermost. These various positions illustrated in FIGURE 2.

As the screws approach the discharge point at the rim of the bowl, they come to a camming edge 30 which is above a portion of the inner edge of the path 14 and is inclined upward from the level of the path to a height equal to or greater than a substantial fraction of the length of one of the setscrews. This camming edge may be conveniently supplied by means of a piece of thin but rigid sheet metal bent into a trough 32 and hung on the rim of the bowl. Setscrews which reach the entering end of the trough 32 in a transverse position project slightly over the edge 30 which thus tends to right such screws to an upright position as the projecting portion rides up the inclination of the edge 30.

Immediately beyond the discharge end 34 of the trough is a track member 36 which may be of the same width as the path 14 on which it bears. The track 36 has an upstanding rail 38 extending longitudinally thereof at or near the middle of the track. The width of the rail is slightly less than that of the slot of the slotted end of a setscrew, the slot being deep enough and the fit on the rail 38 close enough to maintain a screw thereon in an upright position but to permit the screw to travel freely along the rail as the bowl vibrates. The discharge end 34 of the trough 32 is a little higher than the top of the rail 38 so that setscrews which advance through the trough 32 in a prone position tilt downward and forward as they leave the trough and tend to be pushed by the next following screw to an upright position. If the leading end of the screw is the slotted end it will tend to engage on the rail 38 as the vibration of the bowl usually causes the screw to rotate about its long axis so that if its slot is not aligned with the rail when the screw starts its tilt in leaving the trough, it will often turn sufficiently during the tilt to bring the slot to register with the rail. Many of the screws thus mount the rail in an upright position with the cup end uppermost. To eject the screws which do not attain such position on the rail, a deflecting plate 40 is mounted on the wall of the bowl. This may consist of a strip of spring metal attached as at 42 to the bowl and diverging from the wall in the direction of travel of the screws until its free end is spaced from the rail a distance of about half the diameter of a screw, this distance being adjustable by a screw 44 threaded through the wall of the bowl with its inner end bearing against the spring plate 40. If a setscrew is straddling the rail 38 with its cup end up, it is kept from falling into the bowl by the engagement of the rail with the sides of the slot in the screw. A screw which is wrong end up or on its side when it reaches the end of the plate 40 will be toppled off the rail by the plate so that it will fall back to the bottom of the bowl. Shortly beyond the end of the plate 40, a dip or depression 46 is provided in the edge of the rail 38 so that defective screws having a slot of insufficient depth or having a burr in the slot will fall off the rail to the bottom of the bowl.

Beyond this dip 46 the top of the rail slopes gradually downward as at 48, then abruptly upward as at 50. The slope 48 is long enough to accommodate a sufficient number of screws to push the leading screw and those immediately following it up the short incline 50. After a screw has been pushed to the top of the incline 50, it slides rapidly down a gentle slope 52 of the top of the rail to an inverting box 54 by which it is discharged into a tube 55, cup end down, leading to an automatic driving machine (not shown). As the screws are pushed over the top of the incline 50 one by one, the leading screw becomes separated from the rest and enters the box alone so that there is no crowding there to interfere with the inverting function.

Another means of spacing the leading setscrews approaching the inverting box is illustrated in FIGURE 5. A small flap 56 is mounted in a position to be brushed by successive advancing screws. The flap is made of cellophane or other flexible sheet material with just enough stiffness to retard the leading screw until it is pushed past the flap by a number of screws next following. When pushed past the flap, the leading screw travels a substantial distance before the next in line is pushed past the flap. The screws nearing the box 54 are thus separated and spaced apart.

The box 54 has a rectangular entrance passage 58 into which the track 36 and rail 38 extend a short distance. Aligned with the top of the rail 38 within the box is a wire 60 having a diameter equal to the width of the rail 38. Each screw entering the passage 58 on the rail moves onto the wire 60. The width of the passage 58 is slightly greater than the diameter of a screw so that when a screw moves from the rail 50 onto the wire 60, the side walls of the passage 58 maintain it in an upright position until it reaches an inversion chamber 62 within the box. The chamber 62 is cylindrical and coaxial with the wire 60. For convenient access to the interior of the box, the chamber 62 may be in a separable member 64 removably mounted in the box 54. The inner wall of the chamber 62 is the end face of a plug 68 which is secured by a setscrew 70 in the member 64. Part of the inner wall 66 is a helical cam surface which when touched by the upper portion of a screw advancing on the wire 60 topples the screw from the wire so that it is inverted and falls into the tube 55 cup-end down. The wire 60 is supported by the plug 68 and projects therefrom through the inversion chamber 62 and the passage 58 to abut the end of the rail 38.

A modified form of the invention is shown in FIGURE 6, this being a substitute for the plug 68. A cylinder 80 defines an inversion chamber 82 which communicates with a larger cylindrical chamber 84 coaxial therewith, both chambers being coaxial with the wire 60 which extends through them. The cylinder 80 has a slot 86 at the top. The purpose of the two chambers is to sort out and separate screws of two different lengths, as well as to orient them. As the screws advance along the wire 60, the shorter screws will tumble off the wire in the chamber 82 but the longer screws will be supported in an upright position by the sides of the slot 86 until they enter the larger chamber 84. They then tumble off the wire 60 and fall through a tube 88 which leads from a hole in the bottom of this chamber.

While the foregoing description refers particularly to cup-end screws, it is to be understood that the orienting device can also be used for other types of headless screws as, for example, cone-end, flat-end, oval-end, or dog-end.

I claim:

1. In combination with a vibratable bowl having a helical path on its inner wall face from the bottom of the bowl to the rim, an upright rail extending along the middle of a portion of said path at the discharge end thereof, said rail being adapted to be straddled by the slotted end of a headless setscrew, a stationary member at the exit end of said path having a passage therein slightly wider than the diameter of the screws to be received from the bowl, said rail entering said passage, a wire supported in said passage abutting and in alignment with the top of said rail and midway between the sides of said passage, said member enclosing a chamber next to said passage large enough to permit a screw entering the chamber and advancing onto said wire to tumble from said wire, and a tube supported beneath the wire in position to receive screws tumbling therefrom.

2. Apparatus as described in claim 1, and a fixed cam surface in said chamber engageable by screws advancing into said chamber on said wire to tumble said screws from said wire.

3. Apparatus as described in claim 1, said path having on a portion thereof preceding said rail a trough with an upwardly inclined edge adapted to be engaged by advancing screws athwart the path, whereby said screws tend to be cammed to an upright position.

4. Apparatus as described in claim 1, including means separating the screws advancing on said rail as they approach said stationary member.

5. Apparatus as described in claim 1, and an adjustable deflector member mounted on the wall of said bowl near said rail and engageable by screws advancing on said rail to deflect therefrom the screws which do not straddle said rail.

6. Apparatus as described in claim 1, said rail having a dip therein whereby to discard screws having defective slots therein.

References Cited by the Examiner

UNITED STATES PATENTS

| | | | |
|---|---|---|---|
| 3,069,049 | 12/1962 | Brown | 198—33.1 |
| 3,134,477 | 5/1964 | Moore | 198—33.1 |

EVON C. BLUNK, *Primary Examiner.*

R. E. AEGERTER, *Assistant Examiner.*